United States Patent
Yeh et al.

(10) Patent No.: US 8,185,342 B2
(45) Date of Patent: May 22, 2012

(54) ESTIMATING ROTOR ANGULAR POSITION AND VELOCITY AND VERIFYING ACCURACY OF POSITION SENSOR OUTPUTS

(75) Inventors: Chia-Chou Yeh, Lomita, CA (US); Brian A. Welchko, Torrance, CA (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 467 days.

(21) Appl. No.: 12/541,734

(22) Filed: Aug. 14, 2009

(65) Prior Publication Data

US 2011/0040519 A1    Feb. 17, 2011

(51) Int. Cl.
*G01P 3/00* (2006.01)
(52) U.S. Cl. ........................................ 702/145
(58) Field of Classification Search .................... 702/145
See application file for complete search history.

(56) References Cited

U.S. PATENT DOCUMENTS

2009/0302792 A1 * 12/2009 Osada et al. ............. 318/400.21

OTHER PUBLICATIONS

Sepe, R.B., et al., "Real-time observer-based (adaptive) control of a permanent-magnet synchronous motor without mechanical sensors," IEEE Transactions on Industry Applications, Nov./Dec. 1992, pp. 1345-1352, vol. 28, No. 6.

Batzel, T.D., et al., "Electric propulsion with the sensorless permanent magnet synchronous motor: model and approach," IEEE Transactions on Energy Conversion, Dec. 2005, pp. 818-825, vol. 20, No. 4.

Wu, R., et al., "A permanent magnet motor drive without a shaft sensor," IEEE Transactions on Industry Applications, Sep./Oct. 1991, pp. 1005-1011, vol. 27, No. 5.

Consoli, A., et al., "Sensorless vector and speed control of brushless motor drives," IEEE Transactions on Industrial Electronics, Feb. 1994, pp. 91-96, vol. 41, No. 1.

Ha, J-I., et al., "Sensorless rotor position estimation of an interior permanent-magnet motor from initial states," IEEE Transactions on Industry Applications, May/Jun. 2003, pp. 761-767, vol. 39, No. 3.

Ogasawara, S., et al., "Implementation and position control performance of a position-sensorless IPM motor drive system based on magnetic saliency," Jul./Aug. 1998, pp. 806-812, vol. 34, No. 4.

Hu, J., et al., "Eddy current effects on rotor position estimation and magnetic pole identification of PMSM at zero and low speeds," IEEE Transactions on Power Electronics, Sep. 2008, pp. 2565-2575, vol. 23, No. 5.

Mizutani, R., et al., "Current model-based sensorless drives of salient-pole PMSM at low speed and standstill," IEEE Transactions on Industry Applications, Jul./Aug. 1998, pp. 841-846, vol. 34, No. 4.

* cited by examiner

*Primary Examiner* — Aditya Bhat
(74) *Attorney, Agent, or Firm* — Ingrassia Fisher & Lorenz, P.C.

(57) ABSTRACT

Methods, system and apparatus are provided for estimating rotor angular position and angular velocity during a position sensor fault, and for verifying the accuracy or inaccuracy of a position sensor's outputs based on the estimated rotor angular position and angular velocity of the rotor following a position sensor fault.

19 Claims, 3 Drawing Sheets

ESTIMATING ROTOR ANGULAR POSITION AND VELOCITY AND VERIFYING ACCURACY OF POSITION SENSOR OUTPUTS

TECHNICAL FIELD

The present invention generally relates to hybrid and electric vehicle power systems, and more particularly relates to techniques for estimating a rotor's angular position and velocity and for verifying the accuracy or inaccuracy of a position sensor's output information following a position sensor fault.

BACKGROUND OF THE INVENTION

Hybrid and electric vehicles (HEVs) typically include an electric traction drive system that includes an alternating current (AC) electric motor which is driven by a power converter with a direct current (DC) power source, such as a storage battery. Motor windings of the AC electric motor can be coupled to inverter sub-modules of a power inverter module (PIM). Each inverter sub-module includes a pair of switches that switch in a complementary manner to perform a rapid switching function to convert the DC power to AC power. This AC power drives the AC electric motor, which in turn drives a shaft of HEV's drivetrain. Traditional HEVs implement two three-phase pulse width modulated (PWM) inverter modules and two three-phase AC machines (e.g., AC motors) each being driven by a corresponding one of the three-phase PWM inverter modules that it is coupled to.

Many modern high performance AC motor drives use the principle of field oriented control (FOC) or "vector" control to control operation of the AC electric motor. In particular, vector control is often used in variable frequency drives to control currents fed to a three-phase AC electric motor so that angular velocity of motor's rotor can be controlled and hence the torque applied to a shaft can be controlled. In vector control, stator phase currents are measured and converted into a corresponding complex space vector. This current vector is then transformed to a coordinate system rotating with the rotor of the three-phase AC electric motor. This technique requires knowledge of the rotor's angular position (i.e., the mechanical rotational angular position of rotor relative to the "stator" or motor windings).

The rotor's angular position can be computed based on actual measured quantities using some type of speed or position sensor for control feedback measurement. For instance, to determine the angular position of the rotor, its angular velocity can be measured with a speed sensor, and the angular position can then be obtained by integrating the angular velocity measurements.

Other field-oriented or vector controlled systems may use a rotor angular position sensor or rotational transducer that provides absolute position information directly to implement motor control techniques. One such example would be a resolver and resolver-to-digital converter circuit, which directly provides position information that corresponds to the rotor's angular position.

The position sensor is an important device in providing necessary information regarding the rotor's angular position. However, in some cases a position sensor can experience a fault or fail in which case position measurements provided by the position sensor will usually be incorrect or missing completely. For instance, a loss-of-tracking (LOT) failure can result, for example, when the motor is operating in its overspeed region and the rotor's angular velocity (or "motor speed") exceeds a tracking threshold limit of the position sensor. Alternatively, LOT failure can also result, for example, when an internal position error of the position sensor exceeds a certain preset threshold. When a position sensor experiences a LOT failure, the rotor angular position measurements that are normally provided by the position sensor will usually be incorrect or missing completely. As such, it becomes necessary to immediately shutdown the electric motor-drive since it relies on this information to ensure correct operation.

Once the rotor's angular velocity returns to within the position sensor's tracking limits, many electric motor-drive systems enter a position sensor recovery mode (PSRM). Before placing the motor control processor back into its normal field-oriented or vector control operating mode, it is prudent to verify the accuracy of the position sensor's angular position output to ensure that the position sensor is generating valid angular position information. Otherwise, it is likely that field-oriented vector control techniques will not work as intended since the rotor angular position information they rely upon from the position sensor could be inaccurate.

It would be desirable to provide improved methods, systems and apparatus for verifying the accuracy or inaccuracy of a position sensor's angular position and velocity outputs following a position sensor fault/failure. It would also be desirable if such improved methods, systems and apparatus simultaneously allowed for a rotor's angular position and velocity (or "motor speed") to be estimated while the position sensor is in fault or failure mode. It would also be desirable if such improved methods, systems and apparatus worked with AC motors including permanent magnet synchronous motors (PMSMs). Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments of the present invention relate to methods, systems and apparatus for verifying the accuracy or inaccuracy of a position sensor's angular position and velocity outputs following a position sensor fault/failure, while also allowing a rotor's angular position and velocity (or "motor speed") to be estimated.

In accordance with some embodiments, methods, systems and apparatus are provided for estimating angular information generated by a motor, such as a permanent magnet synchronous motor (PMSM), in a vector controlled motor drive system that includes an inverter. The inverter generates three-phase voltage signals that drive stator windings of the motor. The motor includes a rotor that rotates about the stator. The system also includes a position sensor designed to generate position sensor outputs (PSout) that include an angular velocity of the rotor and an angular position of the rotor with respect to the stator as the rotor rotates about the stator.

When the position sensor enters a fault mode, the inverter begins to operate in a symmetrical three-phase short-circuit (STPSC) mode. During the STPSC mode the motor generates back EMF voltages in the stator windings that induce three-phase short-circuit current signals in the stator windings. The three-phase stationary-reference-frame short-circuit current signals generated by the motor are measured and used to determine an estimated angular velocity of the rotor and an estimated angular position of the rotor. Based on the estimated rotor angular position and the three-phase stationary-reference-frame short-circuit current signals measured from the motor, an estimated rotor angular velocity of the rotor can be generated. Likewise, the estimated rotor angular velocity can be integrated to generate the estimated rotor angular position.

In accordance with one embodiment, a lookup table is created in advance of system operation via experimental testing. The lookup table comprises a plurality of pre-determined entries that are determined experimentally via offline testing prior to using the system. Each pre-determined entry comprises: a particular measured value of rotor angular velocity and a corresponding particular measured value of a three-phase synchronous-reference-frame short-circuit reference current.

When the system is operating, the estimated rotor angular position is used to transform the three-phase stationary-reference-frame short-circuit current signals into a three-phase synchronous-reference-frame short-circuit current signal. Each of the particular estimated rotor angular velocity values are used to lookup a particular pre-determined entry in the lookup table and generate particular measured values of the three-phase synchronous-reference-frame short-circuit reference current that corresponds to a particular measured value of rotor angular velocity. Each of the three-phase synchronous-reference-frame short-circuit current value are subtracted from the three-phase synchronous-reference-frame short-circuit reference current (output from lookup table) to generate a three-phase short-circuit current error, which can then be used to generate the estimated rotor angular velocity.

In accordance with some embodiments, the estimated rotor angular position and/or the estimated rotor angular velocity can then be used during a position sensor recovery mode (PSRM) to verify validity/invalidity of position sensor outputs (PSout).

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Overview

Embodiments of the present invention relate to methods and apparatus for verifying the accuracy or inaccuracy of a position sensor's angular position output following a position sensor fault/failure.

In the event of a position sensor fault or failure, the disclosed embodiments provide a method, system and apparatus for estimating the angular velocity and the angular position of the rotor from stationary-reference-frame three-phase stator current measurements, and for using such measurements to verify the accuracy or inaccuracy angular position information being output by a position sensor following a position sensor fault/failure. In accordance with the disclosed embodiments, during position sensor recovery mode, techniques are provided for checking the accuracy/inaccuracy of angular position information being output by a position sensor. These techniques can be used to ensure that the position sensor output signal is valid before it is used by a motor control processor for field-oriented vector control purposes. At the same time, these techniques can allow the rotor's angular velocity (or "motor speed") to be estimated even without the presence of the position sensor (e.g., due to the fault or failure of the position sensor). The estimated rotor angular velocity allows the system to monitor the current operating state of the motor so that an immediate shutdown can be initiated if the rotor angular velocity (or "motor speed") is too high. One advantage of the disclosed embodiments is that they are relatively easy to implement and require very little computation power from the motor control processor. Another advantage is that they are also applicable when the motor operates at relatively high speeds.

In one embodiment, methods, systems and apparatus are provided for estimating angular information generated by a motor, such as a permanent magnet synchronous motor (PMSM), in a vector controlled motor drive system that includes an inverter. The inverter generates three-phase voltage signals that drive stator windings of the motor. The motor includes a rotor that rotates about the stator. The system also includes a position sensor designed to generate position sensor outputs (PSout) that include an angular velocity of the rotor and an angular position of the rotor with respect to the stator as the rotor rotates about the stator.

When the position sensor enters a fault mode, the inverter begins to operate in a symmetrical three-phase short-circuit (STPSC) mode. During the STPSC mode the motor generates back EMF voltages in the stator windings that induce three-phase short-circuit current signals in the stator windings. The three-phase stationary-reference-frame short-circuit current signals generated by the motor are measured and used to determine an estimated angular velocity of the rotor and an estimated angular position of the rotor. Based on the estimated rotor angular position and the three-phase stationary-reference-frame short-circuit current signals measured from the motor, an estimated rotor angular velocity of the rotor can be generated. Likewise, the estimated rotor angular velocity can be integrated to generate the estimated rotor angular position.

In accordance with one embodiment, a lookup table is created in advance of system operation via experimental testing. The lookup table comprises a plurality of pre-determined entries that are determined experimentally via offline testing prior to using the system. Each pre-determined entry comprises: a particular measured value of rotor angular velocity and a corresponding particular measured value of a three-phase synchronous-reference-frame short-circuit q-axis reference current ($i_q^{e*}$).

When the system is operating, the estimated rotor angular position is used to transform the three-phase stationary-reference-frame short-circuit current signals into a three-phase synchronous-reference-frame short-circuit current signal. Each of the particular estimated rotor angular velocity values are used to lookup a particular pre-determined entry in the lookup table and generate particular measured values of the three-phase synchronous-reference-frame short-circuit q-axis reference current ($i_q^{e*}$) that corresponds to a particular measured value of rotor angular velocity. Each of the three-phase synchronous-reference-frame short-circuit q-axis current ($i_q^e$) value are subtracted from the three-phase synchronous-reference-frame short-circuit q-axis reference current (output from lookup table) to generate a three-phase short-circuit q-axis current error ($\Delta i_q^e$), which can then be used to generate the estimated rotor angular velocity ($\omega_e$).

In accordance with some embodiments, the estimated rotor angular position and/or the estimated rotor angular velocity can then be used during a position sensor recovery mode (PSRM) to verify validity/invalidity of position sensor outputs (PSout). In one implementation, the verification can be accomplished by sampling a first angular position value of a position sensor angular position output (PSAPout), a first angular velocity value of a position sensor angular velocity output (PSAVout), an estimated rotor angular position value, and an estimated rotor angular velocity value.

Thereafter, the first angular position value can be subtracted from the estimated rotor angular position value to generate a position sensor angular position error (PSAPerror). Likewise, the first angular velocity value can be subtracted from the estimated rotor angular velocity value to generate a position sensor angular velocity error (PSAVerror). It is then determined whether the position sensor error signal (PSAPerror) is greater than a position sensor angular position error tolerance threshold (PSAPETT), and/or whether the position sensor angular velocity error (PSAVerror) is greater than a position sensor angular velocity error tolerance threshold (PSAVETT).

The position sensor output (PSout) is invalid when either the position sensor angular position error signal (PSAPerror) is determined to be greater than the PSAPETT or when the position sensor angular velocity error signal (PSAVerror) is determined to be greater than the PSAVETT.

By contrast, the position sensor output (PSout) is valid when either the position sensor angular position error signal (PSerror) is determined to be less than or equal to the PSAPETT or when the position sensor angular velocity error signal (PSAVerror) is determined to be less than or equal to the PSAVETT.

Prior to describing further details of the disclosed embodiments with reference to FIGS. 2 and 3, a conventional field-oriented vector control motor drive system will be described with reference to FIG. 1.

Figure 1:
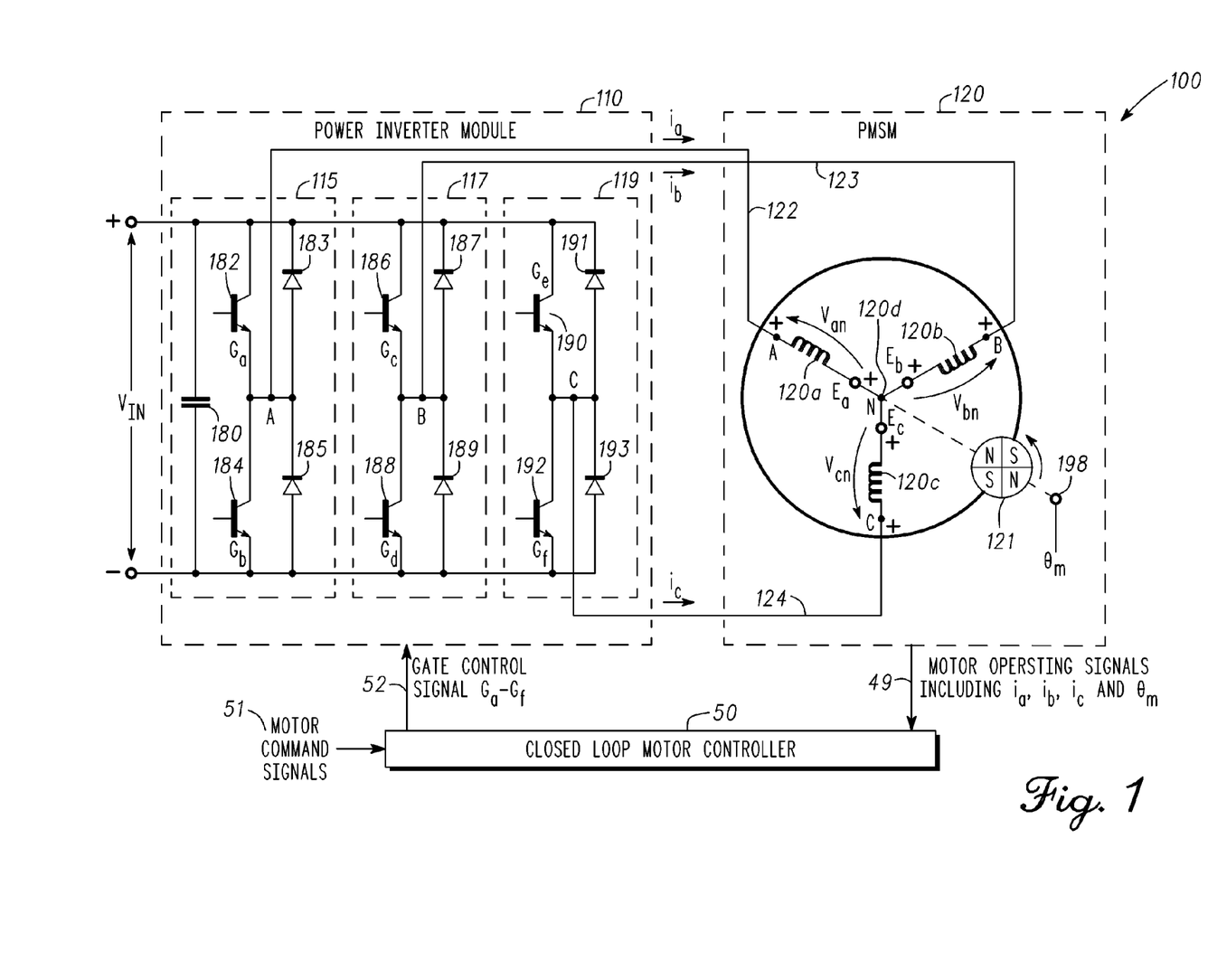
FIG. 1 is a block diagram of a portion of a motor drive system that can be used in accordance with the disclosed embodiments.

FIG. 1 is a block diagram of a portion of a field-oriented vector control motor drive system. The system includes a three-phase voltage source inverter 110 connected to a three phase motor 120. It should be noted that the three-phase voltage source inverter 110 and the three phase motor 120 in FIG. 1 are not limited to this implementation; rather, FIG. 1 is merely one example of how the three-phase voltage source inverter 110 and the three phase motor 120 in FIG. 1 could be implemented in one implementation.

The particular type of three-phase AC motor 120 illustrated in FIG. 1, can be referred to as a star-connected (or Y-connected) three-phase PMSM 120, the particular type of three-phase PWM inverter module 110 can be referred to as a Power Inverter Module (PIM) and more specifically a full wave bridge inverter. These terms will be used interchangeably below. It should be appreciated that the three-phase AC motor 120 illustrated in FIG. 1, could likewise be a delta-connected three-phase motor.

As illustrated in FIG. 1, the three-phase AC motor 120 has a rotor 121 and three stator or motor windings 120a, 120b, 120c connected in a wye-configuration between motor terminals A, B, and C. The three-phase PWM inverter module 110 includes a capacitor 180 and three inverter sub-modules 115, 117, 119. In this embodiment, in phase A the inverter sub-module 115 is coupled to motor winding 120a, in phase B the inverter sub-module 117 is coupled to motor winding 120b, and in phase C the inverter sub-module 119 is coupled to motor winding 120c. The motor windings A, B, C (120a, 120b, 120c) that are coupled together at a neutral point (N) 120d. The current into motor winding A 120a flows out motor windings B 120b and C 120c, the current into motor winding B 120b flows out motor windings A 120a and C 120c, and the current into motor winding C 120c flows out motor windings A 120a and B 120b.

Three-phase stator currents $i_a$, $i_b$, $i_c$ 122-124 flow through respective stator windings 120a, 120b, and 120c. The phase to neutral voltages across each of the stator windings 120a-120c are respectively designated as $V_{an}$, $V_{bn}$, $V_{cn}$, with the back EMF voltages generated in each of the stator windings 120a-120c respectively shown as the voltages $E_a$, $E_b$, and $E_c$ produced by ideal voltage sources each respectively shown connected in series with stator windings 120a-120c. As is well known, these back EMF voltages $E_a$, $E_b$, and $E_c$ are the voltages induced in the respective stator windings 120a-120c by the rotation of permanent magnet rotor. Although not shown, the motor 120 is coupled to a drive shaft.

The power inverter module 110 includes a capacitor 180, a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, power inverter module 110 has six solid state switching devices 182, 184, 186, 188, 190, 192 and six diodes 183, 185, 187, 189, 191, 193 to appropriately switch compound voltage ($V_{IN}$) and provide three-phase energization of the stator windings 120a, 120b, 120c of the three-phase AC motor 120.

As used herein, the term "position sensor" is to be interpreted broadly and refers to any conventional position sensor apparatus that generates angular position information including a physical position sensor device or to a virtual software implementation of a physical position sensor, but to any kind of absolute position sensor or rotational transducer. In the particular implementation illustrated in FIG. 1, the position sensor 198 is a type of rotary electrical transformer used for measuring degrees of rotation, and is designed to generate position sensor outputs (PSout) including one or more of output angular position information ($\theta_m$) and/or angular velocity information that ideally corresponds to the angular position and/or angular velocity of the rotor 121 with respect to a stator of the motor as the rotor rotates about the stator at an angular velocity. In other words, when operating correctly, the position sensor 198 generates absolute angular position information and/or angular velocity information that will ideally correspond to the mechanical angle (θm) of the rotor 121 and/or angular velocity of the rotor 121. Although not illustrated, one common type of position sensor 198 device is a resolver.

The closed loop motor controller 50 can receive motor command signals 51 that drive the motor 120 and motor operating signals 49 from the motor 120. Based on the motor command signals 51 and the feedback motor operating signals 49, the closed loop motor controller 50 generates control signals ($G_a$-$G_f$) 52 that drive/control the switching of solid state switching devices 182, 184, 186, 188, 190, 192 within the inverter sub-modules 115, 117, 119 of the PIM 110. Motor operating signals 49 can be generated based on measured or estimated values from the motor 120. The motor operating signals 49 can include the measured stator currents ($i_a$, $i_b$, $i_c$) 122-124, and the angular position ($\theta_m$) information and/or angular velocity information that is generated by the position sensor 198.

By providing appropriate control signals 52 to the individual inverter sub-modules 115, 117, 119, the closed loop motor controller 50 controls switching of solid state switching devices 182, 184, 186, 188, 190, 192 within the inverter sub-modules 115, 117, 119 and thereby controls the outputs of the inverter sub-modules 115, 117, 119 that are provided to motor windings 120a, 120b, 120c, respectively. The inverter sub-modules 115, 117, 119 of the three-phase inverter module 110 cause stator currents ($i_a$, $i_b$, $i_c$) 122-124 to flow in motor windings 120a, 120b, 120c. The resultant voltages at $V_{an}$, $V_{bn}$, $V_{cn}$, $E_a$, $E_b$, and $E_c$ fluctuate over time depending on the open/close state of switches 182, 184, 186, 188, 190, 192 in the inverter sub-modules 115, 117, 119 of the inverter module 110.

Position Sensor Fault or Failure

As described above, in some cases, the position sensor 198 experiences a fault or failure, in which case the angular position information ($\theta_m$) and/or angular velocity information that is output by the position sensor 198 can be inaccurate. In this regard, it is noted that the position sensor 198 can enter fault mode or fail for a variety of reasons, and faults and failures of the position sensor 198 are not restricted to the LOT fault/failure mode discussed in the background section of the present application. LOT faults/failures are just one example of types of failures.

Short-Circuit Mode

In the event of a position sensor fault/failure, a motor control processor (not shown) will cause the PMSM 120 to immediately transition out of its normal field-oriented vector control operating mode into a symmetrical three-phase short-circuit mode. This symmetrical three-phase short-circuit condition is accomplished by closing either (1) all of the upper switches 182, 186, 190 in all three phases A, B, C or (2) all of the lower switches 184, 188, 192 in all three phases A, B, C of the power inverter module 110. This prevents power from returning back to the battery (not illustrated) through rectification, such as in uncontrolled generation mode, which might cause battery over-charging due to high motor back EMFs that result at high motor speeds when the angular velocity of the rotor is relatively high.

During this symmetrical three-phase short-circuit mode, the motor back EMFs Ea, Eb, Ec in the stator windings 120a, 120b, 120c, due to the magnet flux density, will induce stator currents 122-124 (which will henceforth be referred as the three-phase short-circuit currents) in the stator windings 120a, 120b, 120c. Since these stator currents 122-124 are generated in this symmetrical three-phase short-circuit mode, they will be referred to below as three-phase short-circuit currents, and will be represented in FIG. 2 using the symbols $i_a^s$, $i_b^s$, $i_c^s$ and reference numbers 222, 223, 224, respectively.

Figure 2:
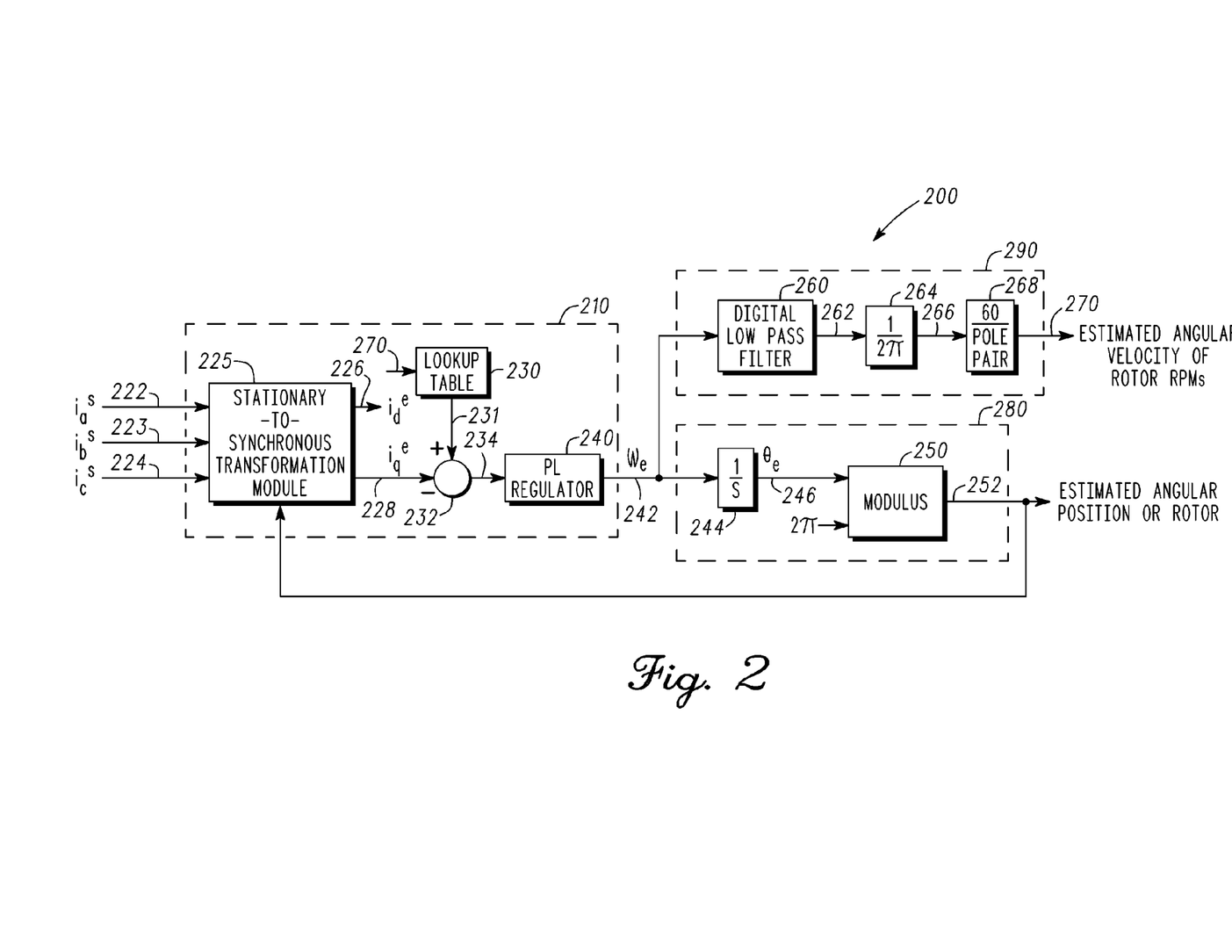
FIG. 2 is a block diagram of an estimation module for estimating angular velocity and position of a rotor in accordance with some of the disclosed embodiments.

FIG. 2 is a block diagram of an estimation module 200 for estimating angular velocity and position of a rotor in accordance with some of the disclosed embodiments.

The system 200 includes a rotor angular velocity estimation module 210, a rotor angular position estimation module 280 and an estimated rotor angular velocity conversion module 290. As used herein the term "module" refers to a device, a circuit, an electrical component, and/or a software based component for performing a task. As will be described below, the disclosed embodiments provide techniques that allow for the angular velocity and position of a rotor to be estimated from three-phase stator current measurements in the stationary-reference-frame. These estimates can then be used to check the accuracy of a position sensor's angular position output.

In one embodiment, the rotor angular velocity estimation module 210 includes a stationary-to-synchronous transformation module 225, a lookup table (LUT) 230, a subtraction module 232, and a proportional-integral (PI) regulator 240. As inputs, the stationary-to-synchronous transformation module 225 receives measured, three-phase, short-circuit current signals ($i_a^s$, $i_b^s$, $i_c^s$) 222-224 in the stationary-reference-frame from the PMSM 120 (of FIG. 1) and an estimated rotor angular position 252. The stationary-to-synchronous transformation module 225 uses these inputs to transform the measured, three-phase, stationary-reference-frame short-circuit currents ($i_a^s$, $i_b^s$, $i_c^s$) 222-224 into three-phase short-circuit current signals ($i_d^e$, $i_q^e$) 226, 228 in the synchronous-reference-frame. When the motor is a PMSM, the d-axis is defined as the axis that is aligned with the north magnetic pole of the rotor magnet, whereas the q-axis is displaced 90 electrical degrees from the d-axis of the rotor magnet. The output of the stationary-to-synchronous transformation module 225 can also be referred to herein as a three-phase synchronous-reference-frame short-circuit d-axis current signal ($i_d^e$) 226 and a three-phase synchronous-reference-frame short-circuit q-axis current signal ($i_q^e$) 228. The process of stationary-to-synchronous conversion can be performed using Clarke and Park Transformations that are well-known in the art and for sake of brevity will not be described in detail. One implementation of the Clarke and Park Transformations is described in "Clarke & Park Transforms on the TMS320C2xx," Application Report Literature Number: BPRA048, Texas Instruments, 2007, which is incorporated by reference herein in its entirety.

In one embodiment, the LUT 230 stores measured values of rotor angular velocity and corresponding measured values of the three-phase synchronous-reference-frame short-circuit q-axis reference current signal ($i_q^{e*}$) 231. In one implementation, values that are stored in the LUT 230 are experimentally measured (i.e., pre-determined) via testing that takes place offline prior to using the system 200. The LUT 230 includes a plurality of entries, where each entry comprises: a particular measured value of rotor angular velocity that corresponds to a particular measured value of a q-axis reference current ($i_q^{e*}$) 231 in the synchronous-reference-frame. When the LUT 230 receives a particular estimated rotor angular velocity 270 as an input, the LUT 230 looks up a corresponding entry and outputs a single corresponding value of measured q-axis reference current ($i_q^{e*}$) 231 that corresponds to that particular measured rotor angular velocity 270. In other words, the LUT 230 generates an output current signal 231 that is a particular value of the q-axis reference current signal ($i_q^{e*}$) obtained offline through experimental testing. The subtraction module 232 subtracts the measured value of the three-phase synchronous-reference-frame short-circuit q-axis current ($i_q^e$) 228 from the lookup table three-phase synchronous-reference-frame short-circuit q-axis reference current ($i_q^{e*}$) 231 to generate a three-phase short-circuit q-axis current error signal ($\Delta i_q^e$) 234. The error signal ($\Delta i_q^e$) 234 is simply the difference between the three-phase synchronous-reference-frame short-circuit q-axis current signal ($i_q^e$) 228 and the short-circuit q-axis reference current signal ($i_q^{e*}$) 231.

In another embodiment, the LUT 230 stores measured values of rotor angular velocity and corresponding measured values of the three-phase synchronous-reference-frame short-circuit d-axis reference current signal ($i_d^{e*}$) 231. The LUT 230 includes a plurality of entries, where each entry comprises: a particular measured value of rotor angular velocity that corresponds to a particular measured value of a d-axis reference current ($i_d^{e*}$) 231 in the synchronous-reference-frame. When the LUT 230 receives a particular estimated rotor angular velocity 270 as an input, the LUT 230 looks up a corresponding entry and outputs a single corresponding value of measured d-axis reference current ($i_d^{e*}$) 231 that corresponds to that particular measured rotor angular velocity 270. In other words, the LUT 230 generates an output current signal 231 that is a particular value of the d-axis reference current signal ($i_d^{e*}$) obtained offline through experimental testing. The subtraction module 232 subtracts the measured value of the three-phase synchronous-reference-frame short-circuit d-axis current ($i_d^e$) 226 from the output signal 231 to generate a three-phase short-circuit d-axis current error signal ($\Delta i_d^e$) 234 that corresponds to the estimated rotor angular velocity in the LUT 230. The error signal ($\Delta i_d^e$) 234 is simply the difference between the three-phase synchronous-reference-frame short-circuit d-axis current signal ($i_d^e$) 226 and the short-circuit d-axis reference current signal ($i_d^{e*}$) 231.

The former embodiment is preferred over this embodiment due to the small magnitude of the q-axis current ($i_q^e$) 228 in comparison to that of the d-axis current ($i_d^e$) 226. During symmetrical three-phase short-circuit mode at high motor speed, the majority of the motor currents are projected on the d-axis and the remainder is projected on the q-axis. Hence, the d-axis current ($i_d^e$) is much larger in magnitude than the q-axis current ($i_q^e$). Moreover, the dq current magnitudes are subjected to change with motor temperature. Hence, a small percentage change of the d-axis current with the varying motor temperature will be greater in magnitude than the same percentage change in the q-axis current. Accordingly, this would result in a higher rotor angular position estimation error if the latter embodiment is employed.

The Proportional-Integrator (PI) regulator 240 receives the three-phase short-circuit q-axis current error signal ($\Delta i_q^e$) 234 and uses this signal to generate an estimated rotor angular velocity ($\omega_e$) 242 in electrical radians per second. The PI regulator 240 minimizes the error so that the measured q-axis current will match closely with the reference value 231 from the LUT 230. In doing so, the output of the PI regulator 240 will be the estimated rotor angular velocity ($\omega_e$) 242 in electrical radians per second. Proportional-Integral (PI) regulators are well-known in the art and for sake of brevity will not be described in further detail.

In one embodiment, the rotor angular position estimation module 280 includes an integrator 244 and a modulus function 250. The integrator 244 integrates the estimated rotor angular velocity ($\omega_e$) 242 to produce an estimated rotor angular position ($\theta_e$) 246 that is between 0 to $2\pi$ electrical radians. The estimated rotor angular position 252 can then be used by the stationary-to-synchronous transformation module 225 to perform a stationary-reference-frame (abc) to synchronous-reference-frame (dq) transformation as described above. In accordance with the disclosed embodiments, it is to be appreciated that the computed estimated rotor angular position 252 is not intended for use with field-oriented vector control techniques, but it to be used to estimate angular position and angular velocity of the rotor.

In one embodiment, the estimated rotor angular velocity conversion module 290 includes a digital low pass filter 260, a frequency conversion module 264, and a frequency-to-speed conversion module 268. The estimated rotor angular velocity ($\omega_e$) 242 signal generated by the PI regulator 240 is filtered by a digital low-pass filter 260 to obtain the DC component 262 which is the filtered rotor angular velocity in electrical radians per second. The frequency conversion module 264 converts the DC component 262 which is the filtered rotor angular velocity to compute the frequency 266 of the signal. Based on the frequency 266 of the signal, the frequency-to-speed conversion module 268 then computes a corresponding estimated rotor angular velocity 270 in revolutions per minute (rpm).

Figure 3:
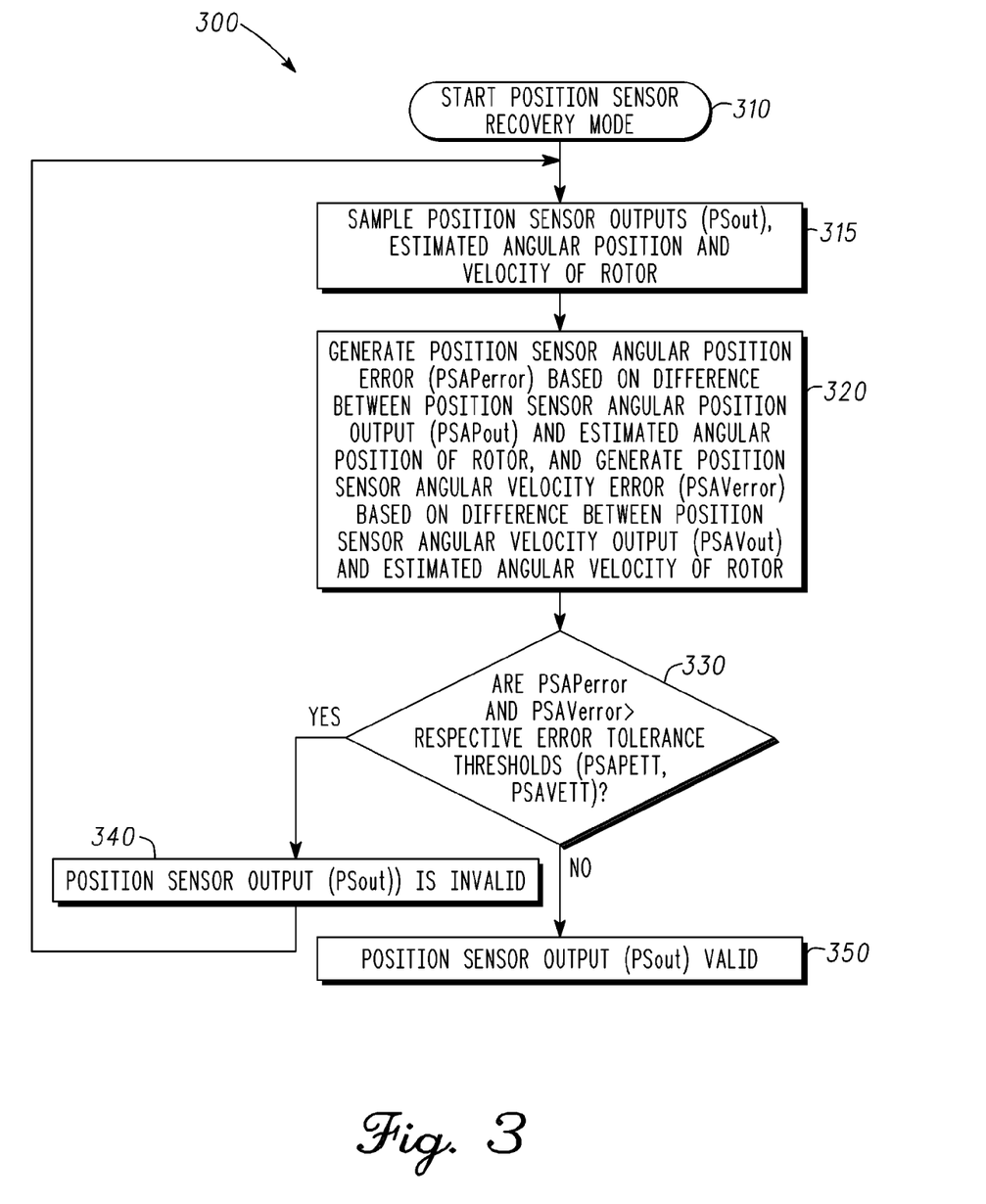
FIG. 3 is a flowchart illustrating a method for verifying the accuracy or inaccuracy of a position sensor's angular position and angular velocity outputs in accordance with some of the disclosed embodiments.

FIG. 3 is a flowchart illustrating a method 300 for verifying the accuracy or inaccuracy of a position sensor's angular position and angular velocity outputs in accordance with some of the disclosed embodiments. Although the method 300 describes determining whether the position sensor's output is valid or invalid based on both angular position and angular velocity outputs, it is to be appreciated that in some embodiments whether the position sensor's output is valid or invalid can be determined based on either the angular position output or the angular velocity output.

Method 300 begins at step 310, when the system enters a position sensor recovery mode (PSRM). In one implementation, the system enters a PSRM when it determines that the position sensor has resumed its tracking ability. The system can determine that the position sensor has resumed its tracking ability when it begins receiving position sensor outputs (PSout) that include information regarding angular position and angular velocity measured by the position sensor.

As soon as the position sensor 198 resumes its tracking ability, the method 300 proceeds to step 315, where values for position sensor output outputs (PSout), estimated rotor angular position 252 and estimated rotor angular velocity 270 in rpm are sampled. The method 300 proceeds to step 320, where the position sensor outputs (PSout) are compared to the estimated values. Specifically, the angular position output by the position sensor 198 is subtracted from the estimated rotor angular position 252 to generate a position sensor angular position error (PSAPerror), and the angular velocity value output by the position sensor 198 is subtracted from the estimated rotor angular velocity 270 to generate a position sensor angular velocity error (PSAVerror). To check the accuracy of position sensor's angular position and angular velocity outputs and verify whether the position sensor is operating correctly, at step 330, the position sensor angular position error (PSAPerror) is compared to a position sensor angular position error tolerance threshold (PSAPETT). Likewise, the position sensor angular velocity error (PSAVerror) is compared to a position sensor angular velocity error tolerance threshold (PSAVETT)

If the position sensor angular position error signal (PSAPerror) is greater than the position sensor angular position error tolerance threshold (PSAPETT) and/or if the position sensor angular velocity error signal (PSAVerror) is greater than the position sensor angular velocity error tolerance threshold (PSAVETT) (e.g., if either one of the errors is outside the tolerance band), the method 300 proceeds to step 340, where the position sensor output (PSout) will be considered invalid, and unacceptable for use by a motor control processor (not shown) for vector control operation. The method 300 loops back to step 315, where new values for the position sensor outputs (PSout), the estimated rotor angular position 252 and the estimated rotor angular velocity 270 are sampled. The method 300 then loops back to step 320, and the processing in steps 320 and 330 repeats for the new values of the position sensor outputs (PSout) and the estimated rotor angular position 252 and the estimated rotor angular velocity 270.

If the position sensor angular position error signal (PSAPerror) is less than or equal to the position sensor angular position error tolerance threshold (PSAPETT) and the position sensor angular velocity error signal (PSAVerror) is less than or equal to the position sensor angular velocity error tolerance threshold (PSAVETT) (e.g., both of the errors are within their respective tolerance bands), then the method 300 proceeds to step 350, where the position sensor outputs (PSout) are considered valid, and can now be used by a motor control processor (not shown) for vector control operation.

The disclosed embodiments described above are described as being applied to a three-phase permanent magnet synchronous AC motor (PMSM), and this term should be understood to encompass Interior Permanent Magnet Synchronous Motor (IPMSM), and Surface Mount Permanent Magnet Synchronous Motor (SMPMSM). However, the disclosed embodiments can apply generally to synchronous AC machines, which can include permanent magnet machines. Permanent magnet machines include surface mount permanent magnet machines (SMPMMs) and interior permanent magnet machines (IPMMs). Although an AC machine can be an AC motor (i.e., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator.

Moreover, although the disclosed methods, systems and apparatus can be implemented in operating environments such as a hybrid/electric vehicle (HEV), it will be appreciated by those skilled in the art that the same or similar techniques and technologies can be applied in the context of other systems. In this regard, any of the concepts disclosed here can be applied generally to "vehicles," where the term "vehicle" broadly refers to a non-living transport mechanism having an AC motor. Examples of such vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

It should be observed that the disclosed embodiments reside primarily in combinations of method steps and apparatus components related to verifying the accuracy or inaccuracy of a position sensor's angular position output following a position sensor fault. Those of skill would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components or modules and various processing steps. However, it should be appreciated that such block components or modules may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. For example, the disclosed embodiments can also be used during restart in sensorless control applications to initialize an observer. Initializing the observer is extremely critical in sensorless control applications where the rotor angular position and angular velocity are estimated by the observer. The estimation accuracy and the tracking ability of the observer largely depend on the initial condition of the observer. Having an initial condition (such as the rotor angular position or velocity) that is set closer to the current operating state of the motor will help to guarantee and provide for faster convergence.

Thus, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for estimating angular information generated by a motor, comprising the steps of:
    causing an inverter to operate in a symmetrical three-phase short-circuit (STPSC) mode when a position sensor enters a fault mode, wherein the position sensor is designed to generate position sensor outputs (PSout) comprising: an angular velocity of a rotor of the motor with respect to a stator as the rotor rotates about the stator at the angular velocity and an angular position of the rotor with respect to the stator as the rotor rotates about the stator;
    measuring three-phase stationary-reference-frame short-circuit current signals generated by the motor when the inverter is operating in the STPSC mode in response to the position sensor entering the fault mode; and
    generating an estimated angular velocity of the rotor and an estimated angular position of the rotor based on the three-phase stationary-reference-frame short-circuit current signals.

2. A method according to claim 1, wherein the step of generating an estimated angular velocity, comprises the step of:
    generating the estimated rotor angular velocity of the rotor based on the estimated rotor angular position and the three-phase stationary-reference-frame short-circuit current signals measured from the motor; and
    integrating the estimated rotor angular velocity to generate the estimated rotor angular position.

3. A method according to claim 2, wherein the step of generating the estimated rotor angular velocity of the rotor based on the estimated rotor angular position and the three-phase stationary-reference-frame short-circuit current signals measured from the motor comprises:
    storing a lookup table comprising a plurality of pre-determined entries that are determined experimentally via offline testing prior to using the system, where each pre-determined entry comprises: a particular measured value of rotor angular velocity and a corresponding particular measured value of a three-phase synchronous-reference-frame short-circuit q-axis reference current $(i_q^{e*})$;
    using the estimated rotor angular position to transform the three-phase stationary-reference-frame short-circuit current signals into a three-phase synchronous-reference-frame short-circuit current signal;
    looking up a particular pre-determined entry in response to receiving a particular estimated rotor angular velocity;
    generating, based on the particular pre-determined entry, a particular measured value of the three-phase synchronous-reference-frame short-circuit q-axis reference current $(i_q^{e*})$ that corresponds to a particular measured value of rotor angular velocity;
    subtracting the three-phase synchronous-reference-frame short-circuit q-axis current $(i_q^e)$ from the three-phase synchronous-reference-frame short-circuit q-axis reference current output from LUT to generate a three-phase short-circuit q-axis current error $(\Delta i_q^e)$; and
    generating, based on the three-phase short-circuit current error signal, the estimated rotor angular velocity $(\omega_e)$.

4. A method according to claim 2, further comprising:
    using the estimated rotor angular position to verify the position sensor outputs (PSout) during a position sensor recovery mode (PSRM).

5. A method according to claim 4, wherein the step of using the estimated rotor angular position, comprises:
    sampling a first angular position value of a position sensor angular position output (PSAPout), a first angular velocity value of a position sensor angular velocity output (PSAVout), an estimated rotor angular position value and an estimated rotor angular velocity value; and
    subtracting the first angular position value from the estimated rotor angular position value to generate a position sensor angular position error (PSAPerror), and subtracting the first angular velocity value from the estimated rotor angular velocity value to generate a position sensor angular velocity error (PSAVerror); and
    determining whether the position sensor error signal (PSAPerror) is greater than a position sensor angular position error tolerance threshold (PSAPETT), and whether the position sensor angular velocity error (PSAVerror) is greater than a position sensor angular velocity error tolerance threshold (PSAVETT).

6. A method according to claim 5, wherein the position sensor output (PSout) is invalid when either the position sensor angular position error signal (PSAPerror) is determined to be greater than the PSAPETT or when the position sensor angular velocity error signal (PSAVerror) is determined to be greater than the PSAVETT, and wherein the position sensor output (PSout) is valid when both the position sensor angular position error signal (PSAPerror) is determined to be less than or equal to the PSAPETT and when the position sensor angular velocity error signal (PSAVerror) is determined to be less than or equal to the PSAVETT.

7. A vector controlled motor drive system, comprising:
    a motor comprising a stator and a rotor designed to rotate about the stator at an angular velocity, wherein the rotor has an angular position with respect to the stator;
    a position sensor that is designed to generate position sensor outputs (PSout), wherein the position sensor outputs (PSout) corresponds to the angular position of the rotor and the angular velocity of the rotor;
    an inverter coupled to the motor and is designed to operate in a symmetrical three-phase short-circuit (STPSC) mode when the position sensor enters a fault mode, wherein the motor is designed to generate three-phase short-circuit current signals in a stationary-reference-frame while the inverter is operating in the STPSC mode; and
an estimation module designed to generate an estimated angular velocity of the rotor and an estimated angular position of the rotor based on the three-phase stationary-reference-frame short-circuit current signals.

8. A vector controlled motor drive system according to claim 7, wherein the estimation module further comprises:
a rotor angular velocity estimation module being designed to: receive an estimated rotor angular position, and the three-phase stationary-reference-frame short-circuit current signals measured from the motor; and generate an estimated rotor angular velocity ($\omega_e$).

9. A vector controlled motor drive system according to claim 8, wherein the rotor angular velocity estimation module, comprises:
a stationary-to-synchronous transformation module designed to receive the estimated rotor angular position, and the three-phase stationary-reference-frame short-circuit current signals measured from the motor, and being designed to generate a three-phase synchronous-reference-frame short-circuit q-axis current signal ($i_q^e$);
a lookup table (LUT) comprising a plurality of pre-determined entries that are determined experimentally via offline testing prior to using the system, where each pre-determined entry comprises: a particular measured value of rotor angular velocity and a corresponding particular measured value of a three-phase synchronous-reference-frame short-circuit q-axis reference current ($i_q^{e*}$), wherein the lookup table is designed to look up a particular pre-determined entry in response to receiving a particular estimated rotor angular velocity and to output a particular measured value of the three-phase synchronous-reference-frame short-circuit q-axis reference current ($i_q^{e*}$) that corresponds to a particular measured value of rotor angular velocity;
a subtraction module designed to subtract the three-phase synchronous-reference-frame short-circuit q-axis current ($i_q^e$) from the three-phase synchronous-reference-frame short-circuit q-axis reference current ($i_q^{e*}$) to generate a three-phase short-circuit q-axis current error ($\Delta i_q^e$); and
a proportional-integral (PI) regulator designed to receive the three-phase short-circuit q-axis current error ($\Delta i_q^e$) and to generate the estimated rotor angular velocity ($\omega_e$).

10. A vector controlled motor drive system according to claim 8, wherein the estimation module further comprises:
a rotor angular position estimation module designed to receive the estimated rotor angular velocity ($\omega_e$) and to generate the estimated rotor angular position.

11. A vector controlled motor drive system according to claim 10, wherein the rotor angular position estimation module further comprises:
an integrator designed to receive the estimated rotor angular velocity ($\omega_e$) and to generate an estimated rotor angular position ($\theta_e$); and
a modulus function designed to receive the estimated rotor angular position ($\theta_e$) and to generate the estimated rotor angular position.

12. A vector controlled motor drive system according to claim 8, wherein the wherein the estimation module further comprises:
an estimated rotor angular velocity conversion module designed to receive the estimated rotor angular velocity ($\omega_e$) in electrical radians per second and to generate an estimated rotor angular velocity in revolutions per minute (rpm).

13. A vector controlled motor drive system according to claim 12, wherein the estimated rotor angular velocity conversion module further comprises:
a digital low pass filter designed to receive the estimated rotor angular velocity ($\omega_e$) in electrical radians per second and to generate filtered rotor angular velocity in electrical radians per second;
a frequency conversion module designed to receive filtered rotor angular velocity and to generate a frequency signal corresponding to the filtered rotor angular velocity; and
a frequency-to-speed conversion module designed to receive frequency signal and to generate the estimated rotor angular velocity in revolutions per minute (rpm).

14. A vector controlled motor drive system according to claim 7, further comprising:
a verification module designed to verify the position sensor outputs (PSout) during a position sensor recovery mode (PSRM).

15. A vector controlled motor drive system according to claim 14, wherein the verification module comprises:
a sampling module designed to sample a first angular position value of a position sensor angular position output (PSAPout), a first angular velocity value of a position sensor angular velocity output (PSAVout), an estimated rotor angular position value and an estimated rotor angular velocity value of the estimated rotor angular position; and
a comparison module designed to:
subtract the first angular position value from the second estimated rotor angular position value to generate a position sensor angular position error (PSAPerror), and subtracting the first angular velocity value from the estimated rotor angular velocity value to generate a position sensor angular velocity error (PSAVerror), and
determine whether the position sensor angular position error signal (PSAPerror) is greater than a position sensor angular position error tolerance threshold (PSAPETT), and whether the position sensor angular velocity error (PSAVerror) is greater than a position sensor angular velocity error tolerance threshold (PSAVETT).

16. A vector controlled motor drive system according to claim 15, wherein the verification module determines that:
the position sensor output (PSout) is invalid when either the position sensor angular position error signal (PSAPerror) is determined to be greater than the PSAPETT or when the position sensor angular velocity error signal (PSAVerror) is determined to be greater than the PSAVETT, and
the position sensor output (PSout) is valid when both the position sensor angular position error signal (PSAPerror) is determined to be less than or equal to than the PSAPETT and when the position sensor angular velocity error signal (PSAVerror) is determined to be less than or equal to the PSAVETT.

17. A vector controlled motor drive system according to claim 7, wherein the inverter generates three-phase voltage signals, and wherein the motor comprises a permanent magnet synchronous motor (PMSM) comprising stator windings that are driven by the three-phase voltage signals, and wherein the PMSM generates back EMF voltages in the stator windings during the STPSC mode that induce the three-phase short-circuit current signals in the stator windings.

18. In a vector controlled motor drive system (VCMDS) comprising a permanent magnet synchronous motor (PMSM) comprising a stator and a rotor designed to rotate about the stator at an angular velocity, a verification module for verifying that an absolute position sensor is generating valid position sensor outputs (PSout) that indicate angular position of the rotor with respect to the stator and angular velocity of the rotor with respect to the stator, the verification module comprising:

an inverter coupled to the motor and is designed to operate in a symmetrical three-phase short-circuit (STPSC) mode when the position sensor enters a fault mode, wherein the motor is designed to generate while the inverter is operating in the STPSC mode; and an estimation module designed to: receive three-phase short-circuit current signals in a stationary-reference-frame; generate an estimated angular velocity of the rotor based on the three-phase short-circuit current signals; and generate an estimated angular position of the rotor based on the estimated angular velocity of the rotor; and a sampling module designed to sample a first angular position value of a position sensor angular position output (PSAPout), a first angular velocity value of a position sensor angular velocity output (PSAVout), and an estimated rotor angular position value and an estimated rotor angular velocity value of the estimated rotor angular position; and a comparison module designed to subtract the first angular position value from the second estimated rotor angular position value to generate a position sensor angular position error (PSAPerror), and subtracting the first angular velocity value from the estimated rotor angular velocity value to generate a position sensor angular velocity error (PSAVerror), and determine whether the position sensor angular position error signal (PSAPerror) is greater than a position sensor angular position error tolerance threshold (PSAPETT), and whether the position sensor angular velocity error (PSAVerror) is greater than a position sensor angular velocity error tolerance threshold (PSAVETT), wherein the verification module determines that:

the position sensor output (PSout) is invalid when either the position sensor angular position error signal (PSAPerror) is determined to be greater than the PSAPETT or when the position sensor angular velocity error signal (PSAVerror) is determined to be greater than the PSAVETT, and the position sensor output (PSout) is valid when both the position sensor angular position error signal (PSAPerror) is determined to be less than or equal to than the PSAPETT and when the position sensor angular velocity error signal (PSAVerror) is determined to be less than or equal to the PSAVETT.

19. A vector controlled motor drive system according to claim 18, wherein the estimation module comprises:

a stationary-to-synchronous transformation module designed to receive the estimated rotor angular position, and the three-phase short-circuit current signals measured from the motor, and being designed to generate a three-phase short-circuit q-axis current signal ($i_q^e$) in a synchronous-reference-frame;

a lookup table (LUT) comprising a plurality of pre-determined entries that are determined experimentally via offline testing prior to using the system, where each pre-determined entry comprises: a particular measured value of rotor angular velocity and a corresponding particular measured value of a three-phase synchronous-reference-frame short-circuit q-axis reference current ($i_q^{e*}$), wherein the lookup table is designed to look up a particular pre-determined entry in response to receiving a particular estimated rotor angular velocity and to output a particular measured value of the three-phase synchronous-reference-frame short-circuit q-axis reference current ($i_q^{e*}$) that corresponds to a particular measured value of rotor angular velocity;

a subtraction module designed to subtract the three-phase synchronous-reference-frame short-circuit q-axis current ($i_q^e$) from the three-phase synchronous-reference-frame short-circuit q-axis reference current ($i_q^{e*}$) to generate a three-phase short-circuit q-axis current error ($\Delta i_q^e$);

a proportional-integral (PI) regulator designed to receive the three-phase short-circuit q-axis current error signal ($\Delta i_q^e$) and to generate the estimated rotor angular velocity ($\omega_e$); and a rotor angular position estimation module designed to receive the estimated rotor angular velocity ($\omega_e$) and to generate the estimated rotor angular position.

\* \* \* \* \*